Jan. 23, 1923.
N. LAFLEUR.
TRUCK DUMPING MECHANISM.
FILED SEPT. 16, 1921.
1,442,954.
5 SHEETS—SHEET 3.
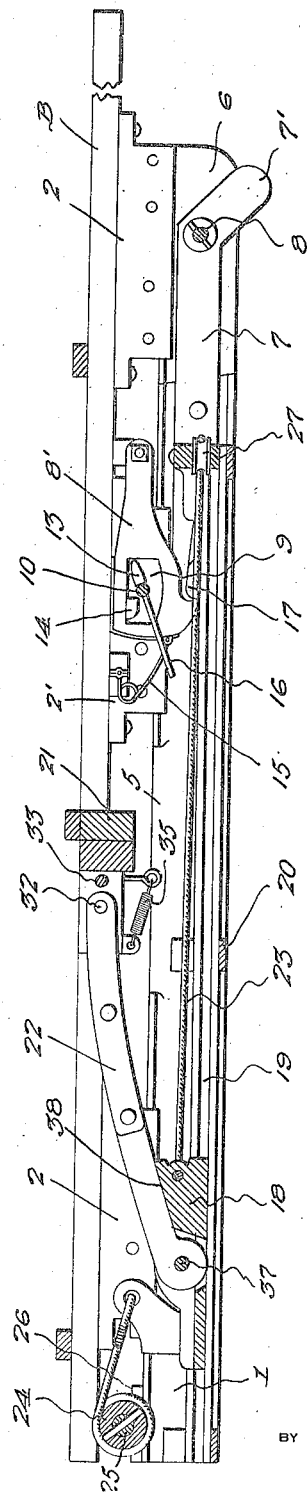
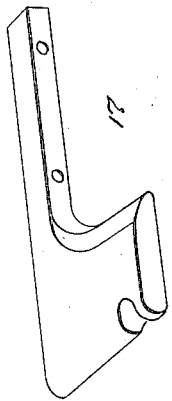
Napoleon Lafleur
INVENTOR
BY Victor J. Evans
ATTORNEY
WITNESS:

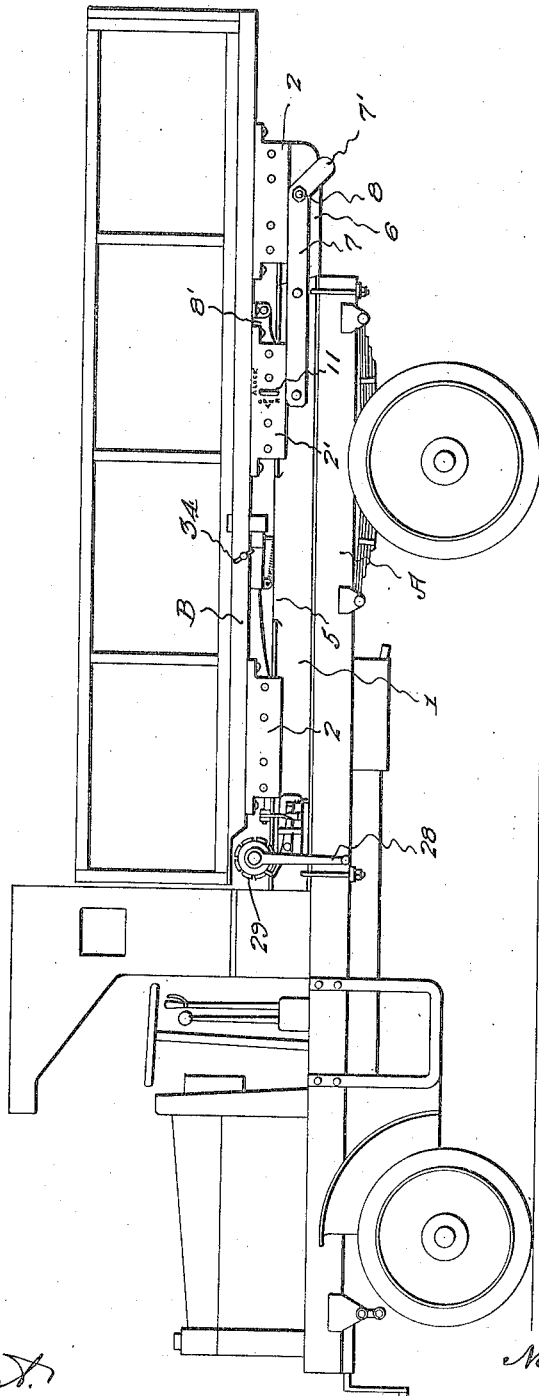

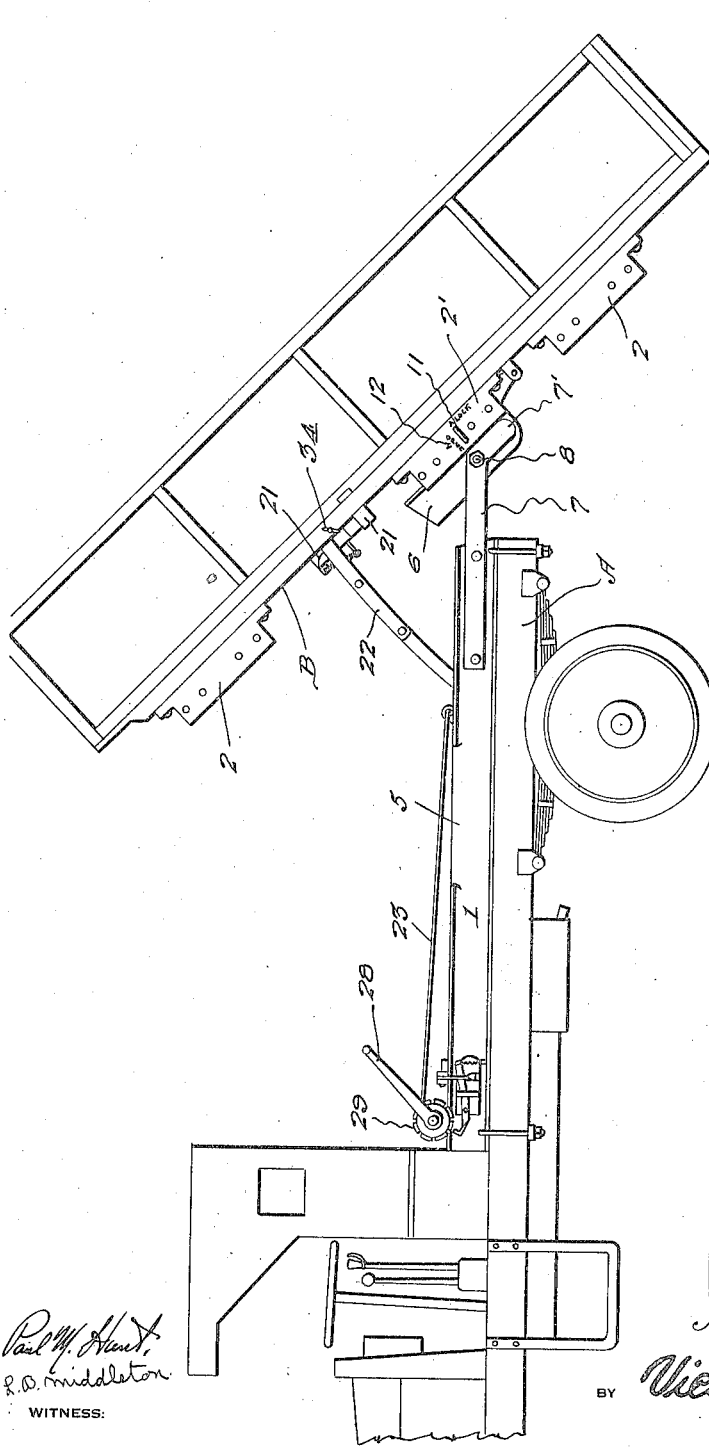

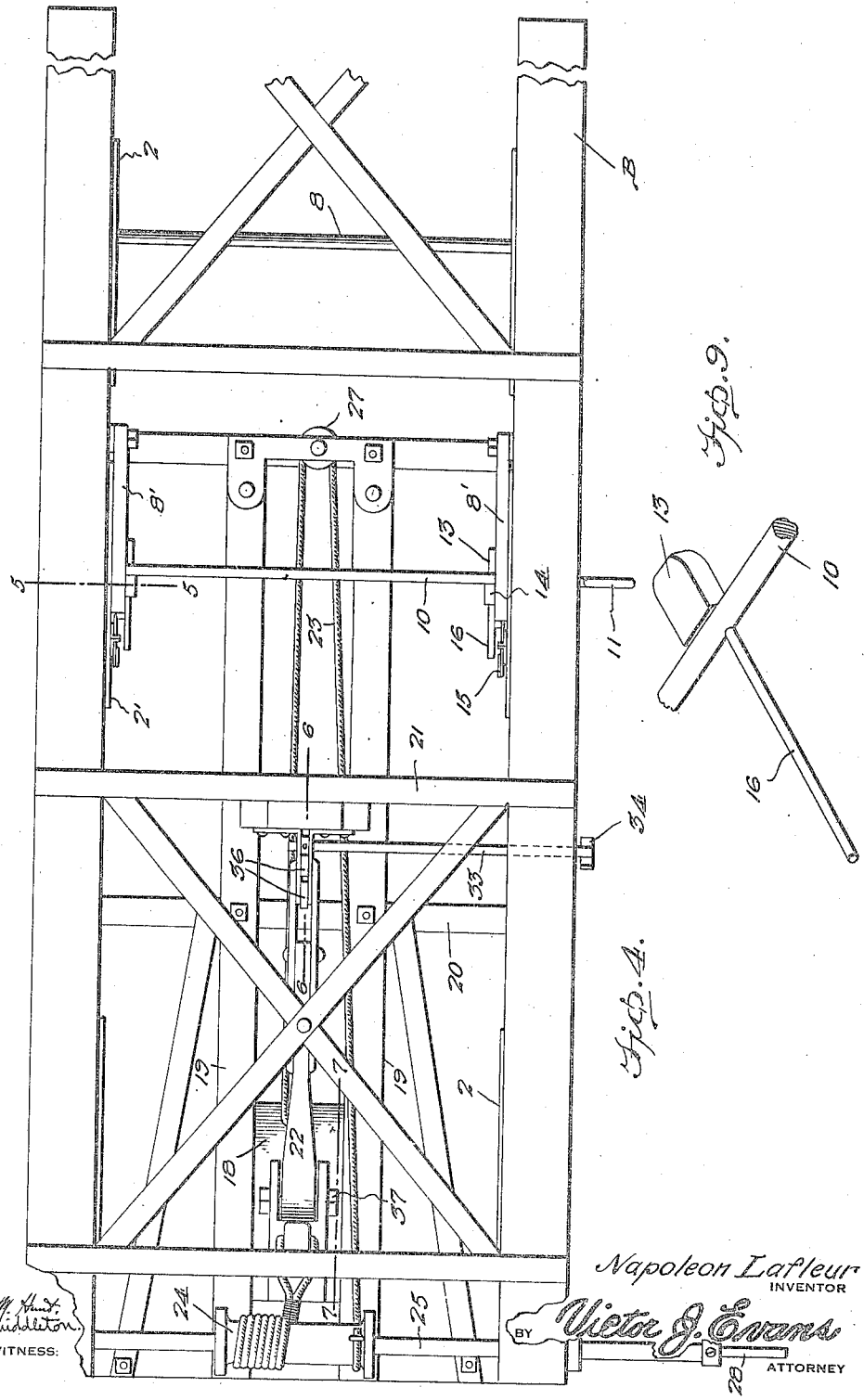

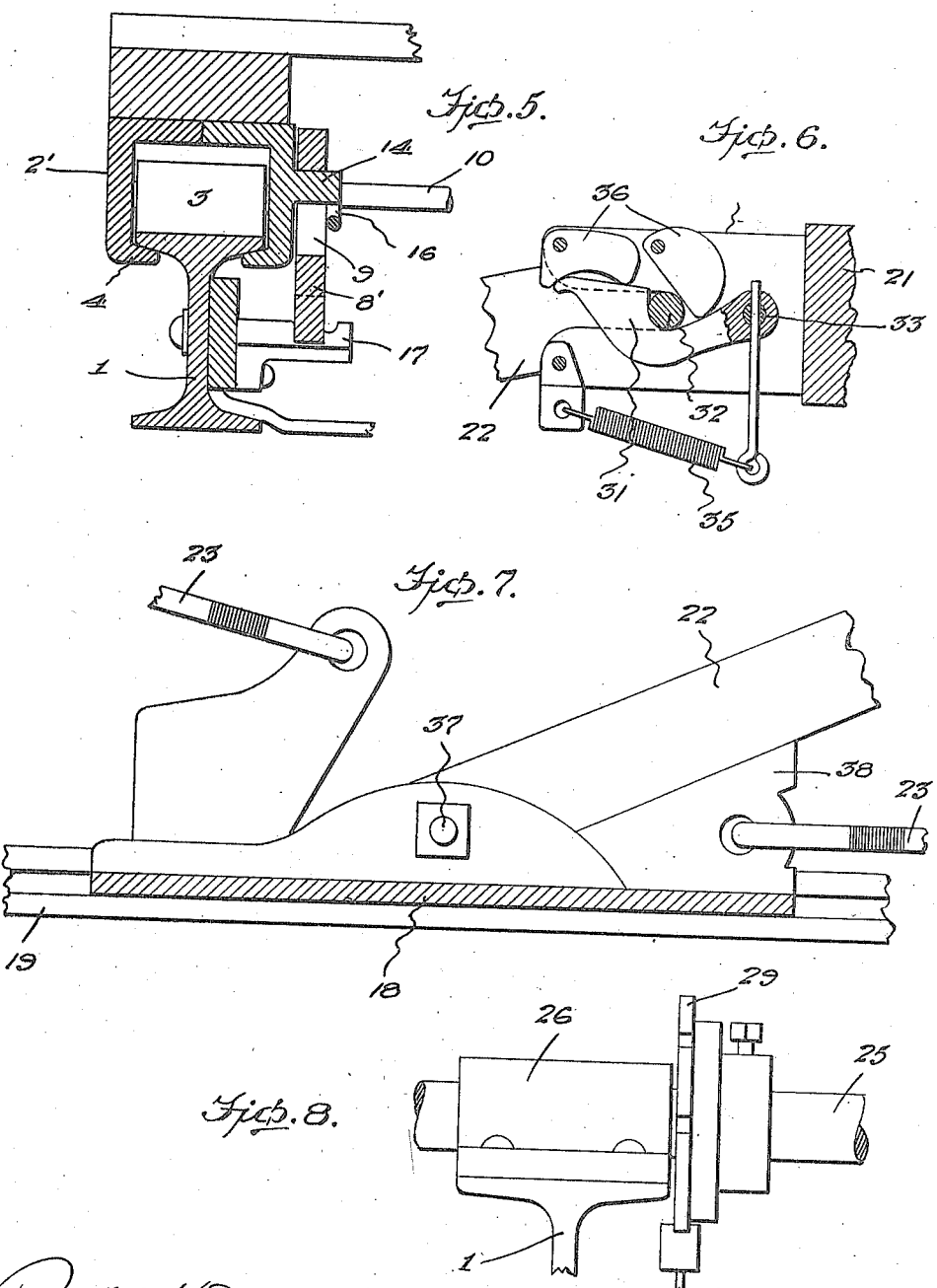

Patented Jan. 23, 1923.

1,442,954

UNITED STATES PATENT OFFICE.

NAPOLEON LAFLEUR, OF MINOT, NORTH DAKOTA.

TRUCK-DUMPING MECHANISM.

Application filed September 16, 1921. Serial No. 501,022.

*To all whom it may concern:*

Be it known that I, NAPOLEON LAFLEUR, a citizen of the United States, residing at Minot, in the county of Ward and State of North Dakota, have invented new and useful Improvements in Truck-Dumping Mechanism, of which the following is a specification.

This invention relates to dumping mechanism for motor and other trucks, the general object of the invention being to provide means whereby the truck body, or the load carrying part thereof, can be moved backwardly upon the chassis and tilted to dump the load and the parts returned to normal position by the rotation of a drum.

Another object of the invention is to provide locking means for holding the body in normal or load carrying position so that the locking means must be moved into inoperative position before the body can be dumped.

A further object of the invention is to provide means whereby the body can be entirely removed from the chassis very easily and quickly.

Still another object of the invention is to provide a sliding member which is connected with the drum by cables and a controlling arm for connecting said member with the body, with means for easily disconnecting the arm from the body when the body is to be removed from the chassis.

Another object of the invention is to so arrange the parts that the entire mechanism can be placed between the chassis frame and the bottom of the body.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a motor truck equipped with my invention.

Figure 2 is a similar view showing the body in dumped position.

Figure 3 is a longitudinal sectional view.

Figure 4 is a plan view with most of the body removed.

Figure 5 is a section on line 5—5 of Figure 4.

Figure 6 is a section on line 6—6 of Figure 4.

Figure 7 is a section on line 7—7 of Figure 4.

Figure 8 is a detail view of the ratchet mechanism for the shaft 23.

Figure 9 is a detail view of the means for operating the latch members.

Figure 10 is a detail view of one of the keeper members.

In these views A indicates the chassis and B the bottom of a motor truck. In carrying out my invention I bolt a rail 1 to each side bar of the chassis frame and I secure a plurality of housings 2 to the side beams of the bottom of the body. The middle pair of the housings, shown at 2′ should be located at the center of the body for a purpose to be hereinafter described. Each housing is provided with a plurality of rollers 3 for engaging the rail and with inwardly extending flanges 4 for engaging the under part of the rail heads for holding the body upon the rails. The head of each rail is provided with a cut away part 5 which is slightly greater than the length of a housing so that when the front housings strike these reduced parts of the rails the flanges 4 will be out of engagement with the rail head so that the housings can be raised above the rails. The rear end of each rail is formed of a hinged part 6, these hinged parts being pivotally connected with the straps 7 which are bolted to the major part of the rails, by the pivot rod 8 which extends transversely between the rails and has its ends passing through the straps and hinged parts. Thus this rod serves as a pivot for both hinged parts. The parts are so proportioned that when the middle housings 2′ are not engaging these hinged parts the front housings will be at the reduced parts of the rails and little effort is required to tilt the body to dump the same. This tilting action causing the hinged parts to swing upon the pivot rod, the rear of the body moving downwardly and the forward part moving upwardly, the forward housings leaving the rails at the reduced parts thereof. The straps 7 are provided with downwardly inclined ends 7' which act as stops to limit the dumping movement of the body.

I provide a pair of latch members 8' for locking the body against movement. Such latch members being pivoted to a part of the body adjacent the middle housings and engaging the inner faces of said housings. Each latch member is provided with an opening 9 through which passes a rod 10 which has its ends passing through the middle housings, one end of the rod being provided with a handle 11 which also acts as an indicator to tell when the latch members are in operative or inoperative position, indicating marks 12 being arranged on the outer face of one of the housings to co-operate with said handle. Lugs 13 are carried by the rod 10 for engaging the upper walls of the openings in the latch members and to raise the latch members when the rod is moved into "open" position. Stops 14 on the inner faces of the housings 2' extend into the openings 9 to limit the movement of the latch members. A spring 15 engages each latch member to hold the same in its downward or locking position. Stems 16 are secured to the rod 10 for automatically moving the rod and its lugs into locking position after the initial movement of the body. Keeper members 17 are located on the inner faces of the rails and the latch members engage these keeper members when the body is in normal or load carrying position. The rear edges of these keeper members are beveled for engaging the rounded edges at the front of the latch members for causing said latch members to ride over the keeper members when the body is being returned to normal position. The latch members are so formed that they will engage the pivot rod 8 just as the body has reached dumping position, thus compelling the body to begin its dumping movement at the proper time. The rod 10 and its attached parts can be used for raising the latch members free of the rod 8 when it is desired to remove the body from the chassis and when the body is being replaced upon the chassis this rod 10 striking the rounded edges of the latch members will raise the same so that the latch members will pass freely over the rod the same as they will ride over the keepers.

The means for moving the body upon the rails comprises a block 18 which is slidingly mounted in guideways 19 which are supported on the cross pieces 20 which connect the rails together. This block is connected to the cross piece 21 forming part of the body by an arm 22 and the block is connected by the cables 23 with the drum 24 carried by the shaft 25 which is mounted in bearings 26 which are secured to the front ends of the rails 1. The cables are oppositely wound upon the drum and one cable is connected with the front end of the block and the other cable with the rear end and this last mentioned cable passes around a pulley 27 which is carried at the rear end of the guideways. Thus the block will be moved in one direction when the drum is revolved to the right and the block will be moved in the opposite direction when the drum is revolved to the left. A detachable crank handle 28 is adapted to engage with the shaft so that the shaft can be revolved by hand and ratchet mechanism 29 is provided for locking the shaft against rotation.

I also provide means for detachably connecting the arm 22 with the body. In order to do this I make the rear end of the arm of forked formation and place a slotted clevis on the cross piece 21 of the body with which the slotted end of the arm will engage when the parts are brought together. A latch 31 is mounted in the clevis for engaging a bolt 32 in the fork of the arm. This latch is operated by a rod 33 which extends through one side of the body where it is provided with a handle 34. A spring 35 tends to hold the latch in locking position. Tumblers 36 are pivotally mounted in the clevis and act to hold the latch in unlocking position against the action of the spring. However, these tumblers, when struck by the bolt 32, will be raised so as to not interfere with the passage of the bolt into the slot and its engagement by the latch.

The front end of the arm is pivotally connected with the block, as shown at 37, and a rest 38 is provided on the block for holding the arm in a position where it will engage the clevis when the parts are moved together. Thus the arm can be freed from the body by turning the rod 33 by its handle 34 and the arm will be automatically connected with the body when the parts are moved together.

As before stated the body is locked in normal or load carrying position by the latch members 8' engaging the keepers 17 and in this position all of the housings are engaging the rails so that it is impossible for the body to be lifted off the chassis. When the body is to be dumped the handle 11 of rod 10 is moved to open position so as to raise the latch members out of engagement with the keepers. The crank is then placed on the shaft and with the operator facing the rear of the truck the shaft is turned to revolve the drum. This movement of the drum will slack the cable connected with the front of the block and pull upon the cable connected with the rear of the block so as to cause said block to move rearwardly along its guideway. This movement of the block will be transmitted to the body by the arm so that the body will move rearwardly along the rails. Thus the operator can move the parts without much effort due to the plurality of rollers in the housings engaging the rails. At the beginning of the movement of the body the stems 16 on rod 10 will be forced across the keepers so that said rod will be returned to its normal or locking position and the springs will lower the latch members. The operator continues to revolve the shaft and as he faces the body he can see the operation of the parts. The rear housings will leave the rails and as soon as the middle housings engage the hinged parts of the rails the latch members will engage rod 8, the front housings being at this time at the reduced parts of the rails. The movement of the block will then cause the arm to force upwardly the front end of the body and thus cause the hinged parts of the rails to rotate upon the pivot rod and thus secure the dumping action of the body. This action will take place with but little effort due to the location of the middle housings at the center of the body. The operator can control this dumping movement by holding back the shaft and drum so that the dumping action can take place very slowly to prevent damage to the articles in the body. After the dumping action has been completed the operator rotates the shaft and drum in an opposite direction and the forward movement of the block will cause the arm to first swing the body into horizontal position, the flanges of the front housings engaging the rails again through the cut away portions and the hinged parts of the rails returning to horizontal position. Then upon the continued rotation of the drum the body slides forwardly upon the rails to normal position. When the latch members strike the keepers they will ride over the same and then be forced into locking position by the springs.

If it is desired to remove the body from the chassis the latch members are raised by their actuating rod when they reach the pivot rod 8 so that the middle housings can pass off the ends of the rails. The arm is then freed from the clevis so as to detach the body from the chassis and the dumping mechanism and then the body can be entirely removed from the rails. As the rod in the forked end of the arm leaves the slot in the clevis the tumblers engaging the latch in the clevis will hold the same in inoperative position so that when the body is again placed on the rails and moved forwardly the bolt in the forked end of the arm striking the tumblers will move them out of the way so that the latch can move into locking position and engage said bolt and thus lock the arm to the body.

By my invention trucks can be very quickly and easily unloaded and the body can be moved to dumping position and returned to normal position by a single operator. The dumping attachment can be placed on trucks without requiring any changes to be made in the truck other than to slightly raise the body off the chassis.

With this invention a truck can be provided with several bodies so that one body can be entirely removed and a new body substituted as the operator can quickly uncouple one body from the truck and run it off and run a new body on to the truck.

The load is dumped to the ground and the body makes a skidway for the articles so that the articles are deposited in a safe and general manner. By causing the body to travel to the rear upon the rails it is not necessary to back the truck itself to the position where the articles are to be dumped, thus saving time and making it easy to deposit articles where it is impossible to back the truck to the position where the articles are to be deposited. The body is positively locked in normal position and cannot be moved in either direction without unlocking. It also positively locks when arriving at dumping position and cannot pass said point unless unlocked.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. Dumping means for vehicle bodies comprising a track adapted to be secured to the chassis, roller carrying means adapted to be connected with the body for engaging the track, hinged parts at the rear end of the track, a sliding member, means for actuating the same, a controlling arm for connecting the said member with a part of the body and locking means for holding the body in load carrying position and for preventing it from passing beyond a dumping position.

2. In a vehicle, a track secured to the chassis thereof, roller housings secured to the body thereof, and engaging the track, hinged parts at the rear of the track, a guideway on the chassis, a member sliding therein, a controlling arm connecting said member with a part of the body, means for detachably connecting said arm with said body, manually operated means for moving said member and locking means for locking the parts in normal or load carrying position and for preventing the body from being moved beyond the dumping position.

3. In a vehicle, a track connected with the chassis thereof, hinged parts at the ends of the track, roller housings connected with the body for engaging the track, said housings having flanges for engaging the heads of the rails of the track, parts of said heads being cut away to permit some of the housings to leave the rails, said housings being so arranged that when the middle pair is engaging the hinged parts the front pair are at the cut away part, locking means for holding the body in load carrying position and for preventing the body from being moved beyond a dumping position, a sliding member, a guideway for the same connected with the chassis, a controlling arm connecting the same with a part of the body, a shaft, a drum thereon, and cables connecting the drum with the sliding member.

4. In a vehicle, a track connected with the chassis thereof, hinged parts at the ends of the track, roller housings connected with the body for engaging the track, a sliding member mounted on the chassis, manually operated means for moving the same, a controlling arm connecting the sliding member with a part of the bottom, spring controlled latch members supported from the body, manually operated means for moving said latch members into inoperative position, keepers connected with the track with which the latch members are adapted to engage to hold the body in load carrying position and a part at the rear end of the track with which the latch members are adapted to engage when the body reaches dumping position.

5. In a vehicle, a track secured to the chassis, roller housings secured to the body thereof and engaging the track, hinged parts at the rear of the track, the pivot of said parts consisting of a rod extending across the track, a guideway on the chassis, a member sliding therein, manually operated means for moving said member, a pivoted controlling arm connecting said member with a part of the body, spring controlled latch members connected with the body, manually operated means for moving said latch members into inoperative position, keepers connected with the track with which the latch members are adapted to engage to hold the body in load carrying position and said latch members being also adapted to engage with the pivot rod for preventing the body from being moved beyond a dumping position.

6. In a vehicle, a track secured to the chassis thereof, roller housings secured to the body thereof and engaging the track, hinged parts at the rear of the track, a guideway connected with the chassis, a member sliding therein, a controlling arm pivotally connected with the sliding member, a manually operated shaft, a drum thereon, oppositely wound cables on the drum and connected with the block, a guiding pulley for one of the cables, a clevis connected with a part of the body, a manually operated latch member connected with the clevis for engaging a part on the controlling arm for detachably connecting said arm with the body, means for automatically causing the arm to be locked to the clevis when the parts are brought together and locking means for holding the body in load carrying position.

In testimony whereof I affix my signature.

NAPOLEON LAFLEUR.